Figure 1:
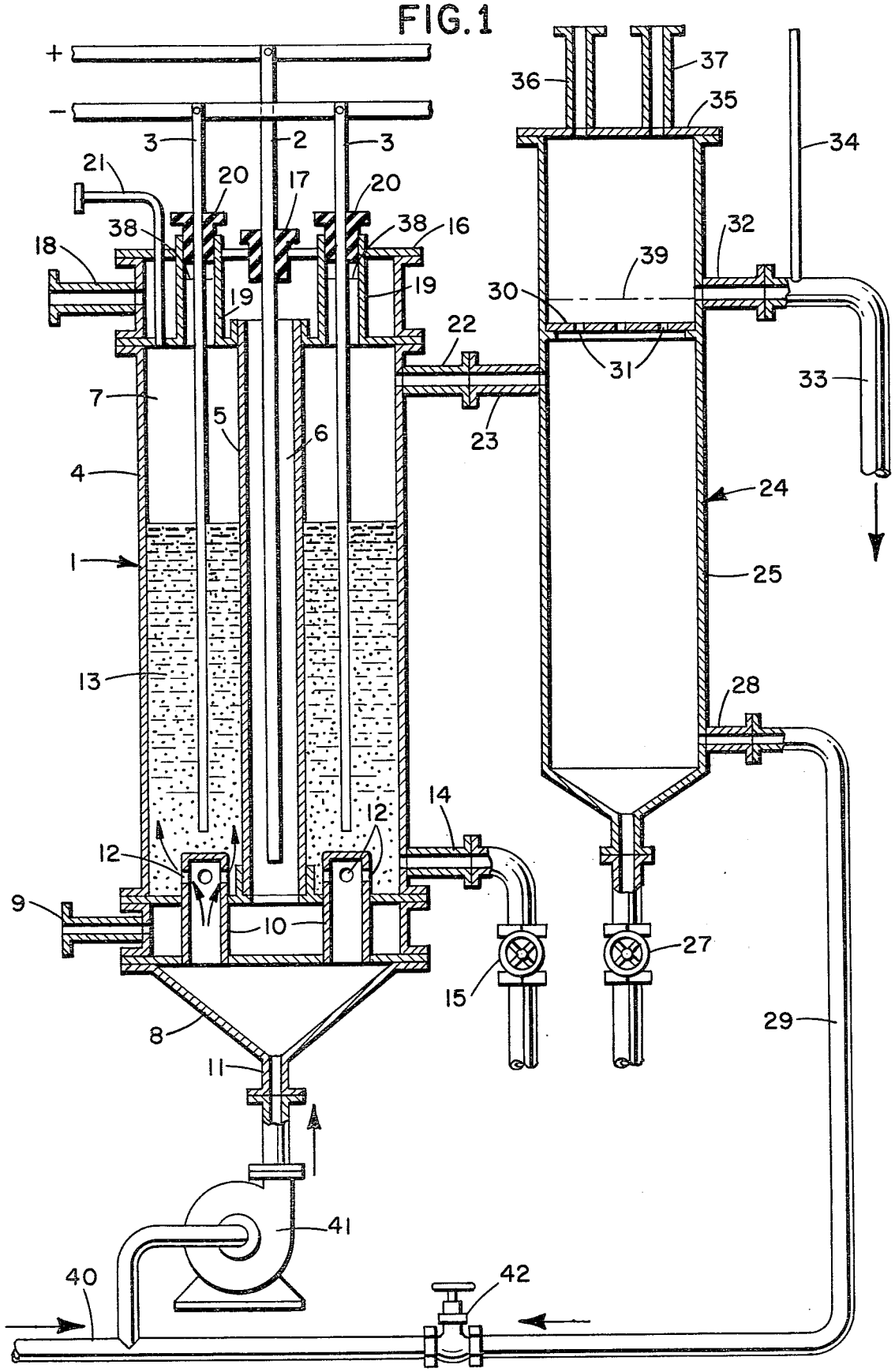

United States Patent [19]

Raats et al.

[11] 4,244,795
[45] Jan. 13, 1981

[54] PROCESS AND APPARATUS FOR ELECTROLYTICALLY REMOVING METAL IONS FROM A SOLUTION THEREOF

[75] Inventors: Christiaan M. S. Raats, Diephenheim; Marinus A. Geelen, Hengevelde, both of Netherlands

[73] Assignee: Akzo N.V., Arnhem, Netherlands

[21] Appl. No.: 41,307

[22] Filed: May 22, 1979

[30] Foreign Application Priority Data

May 24, 1978 [NL] Netherlands .................. 7805607

[51] Int. Cl.$^3$ .................. C25C 1/00; C25C 7/00
[52] U.S. Cl. .................. 204/105 R; 204/266; 204/278
[58] Field of Search .................. 204/130, 140, 105 R, 204/252, 263, 264, 266, 275, 278, 108

[56] References Cited

U.S. PATENT DOCUMENTS

| | | | |
|---|---|---|---|
| 3,787,293 | 1/1974 | Kametani | 204/108 |
| 3,919,062 | 11/1975 | Lundquist, Jr. | 204/130 |
| 3,936,363 | 2/1976 | Fesseden | 204/105 R |
| 3,981,787 | 9/1976 | James | 204/252 |

FOREIGN PATENT DOCUMENTS 1440072  6/1976  United Kingdom .

OTHER PUBLICATIONS

*Erzmetall*, vol. 30, Sep. 1977, No. 9 pp. 365-369.

*Primary Examiner*—T. M. Tufariello
*Attorney, Agent, or Firm*—Stevens, Davis, Miller & Mosher

[57] ABSTRACT

A process and apparatus are provided for electrolytically removing metal ions from a solution thereof with an electrochemical cell having cathode and anode compartments. In accordance with the invention, an aqueous solution is passed upwards through a bed of metallic particles acting as cathodes in the cathode compartment to convert the bed into a fluidized state, i.e., suspend the particles in the solution. A portion of the solution leaving the cathode compartment is recirculated through the bed and the remainder is discharged from the system. The anode compartment is separated from the cathode compartment by a diaphragm. An anode liquid is passed through the anode compartment. The portions of the solution in the cathode compartment and the recirculating solution are protected from contact with air in order to prevent them from absorbing oxygen.

10 Claims, 2 Drawing Figures

PROCESS AND APPARATUS FOR ELECTROLYTICALLY REMOVING METAL IONS FROM A SOLUTION THEREOF

This invention relates to a process for electrolytically removing metal ions from a solution thereof by means of an electrochemical cell. The invention also relates to an apparatus for carrying out the novel process.

A process of this general type is described in *Erzmetall*, Volume 30, September, 1977, (No. 9), pp 365–369 in the paper "Wirbellbettelektrolyse zur Entfernung von Metallen aus verdunnten Losungen" by C. M. S. Raats et al.

The disclosed process is to be practiced for the recovery of metals from solutions and the removal of undesirable metals from waste water. As a result of a difference of potential set up between the anode rods and the cathode rods the metals to be removed from the solution deposit on the particles brought into a suspended and whirling state in the cathode compartment of the electrochemical cell, the particles transferring an electric charge to the current conducting electrode rod or rods present in the compartment as a result of their colliding with each other and with the electrode(s). The particles on which sufficient metal has grown are continuously or intermittently discharged from the cathode compartment.

It has now been found in accordance with this invention that the disclosed process can be improved substantially by increasing the current efficiency to adapt the process for the recovery of metal ions from solutions containing a metal or metal in very low concentrations with an economically attractive recovery. Moreover, it has been found that the running time or active life of the apparatus can be made considerably longer.

It is therefore an object of the invention to provide an economically attractive process and apparatus of the type disclosed in the above-referenced paper by providing a higher current efficiency. Another object of the invention is to provide an improved process and apparatus for electrochemically removing metal ions from a solution thereof which are adapted to remove metal ions from solutions which contain metal ions in very low concentrations as well as those of higher concentrations. It is also an object of the invention to provide an apparatus for removing metal ions from solutions which has an improved active life.

Figure 2:
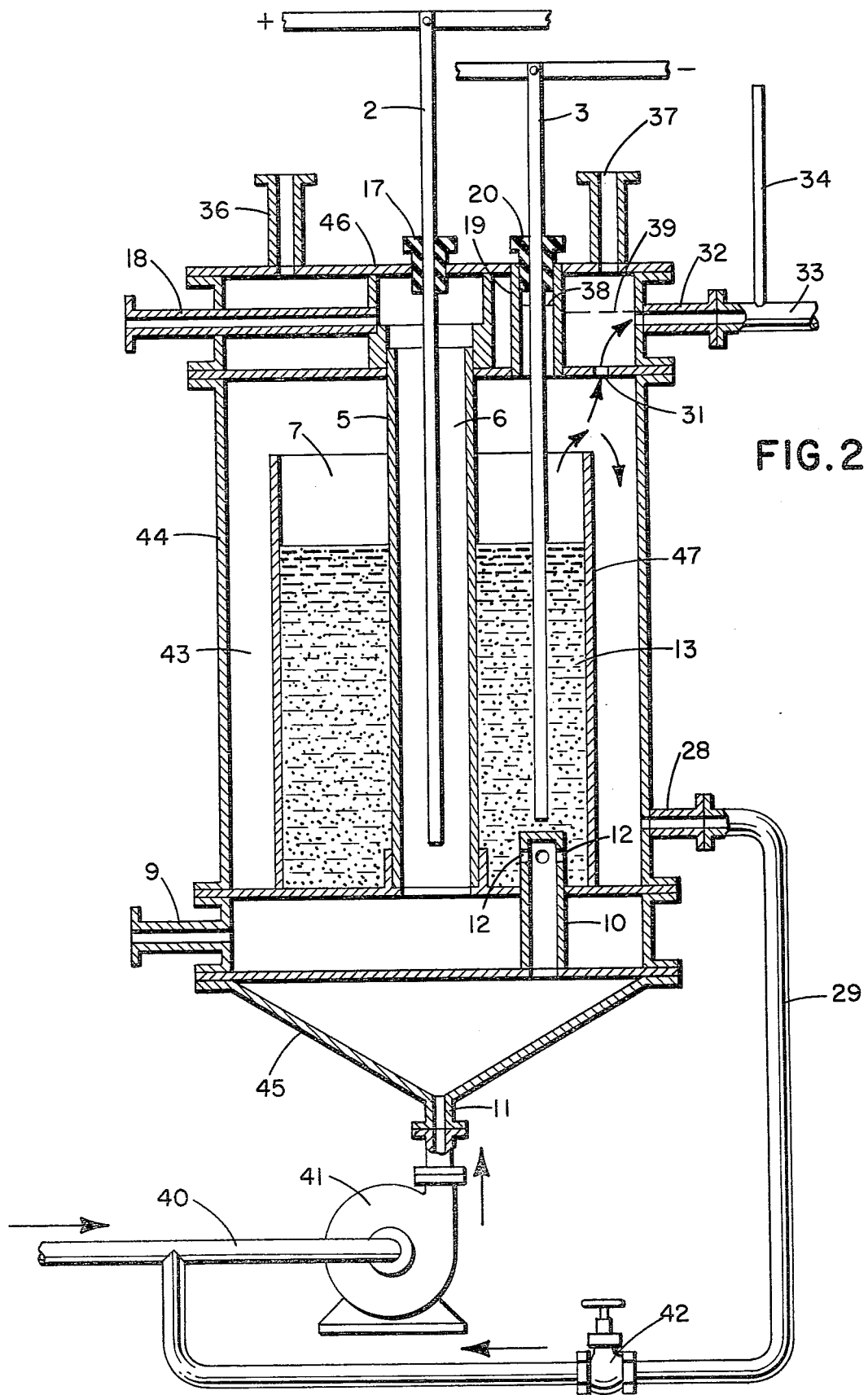

Other objects will become apparent from the following description and the accompanying drawing wherein FIG. 1 is a schematic illustration in longitudinal section of one embodiment of the apparatus provided by the invention; and FIG. 2 is a schematic view, also in longitudinal section, of a second embodiment of the invention.

In the process provided by the invention the apparatus and process described in the above-identified paper are improved by modifying them to separate the solution from air in the cathode compartment and to also screen off air from the recirculating solution to prevent the solution from absorbing oxygen. As a result, the entire surface area of all particles of the fluidized bed will actively participate in the electrochemical reaction and participate in it for a prolonged period. Undesirable oxidation of the surface of the particles because of a too high concentration of oxygen in the solution at the surface of the particles is prevented and other deposits of lower conductivity or nonconductive deposits which would form on the particles and cause their electrolytic action to be limited or even to be completely eliminated are avoided. From the above-mentioned article, a process is known in which the solution leaving the cathode compartment is partially recirculated through the fluidized bed via a gas separator for the gas contained in the solution.

In the separator of the prior art device, an air-exposed liquid surface is maintained and the space over it is ventilated for effectively discharging; for instance, gases such as hydrogen formed in the process.

The process according to the invention is preferably characterized in that a dividing surface is provided in the separator with one or more openings for the passage of gas bubbles and in which an upward flow of the treated solution is maintained, and under which dividing surface the solution flows from the cathode compartment to the separator and the part of the solution to be recirculated is returned to the cathode compartment. The liquid surface is maintained above the dividing surface and there the discharge of the treated solution takes place. A liquid surface is maintained in the top of the cathode compartment within one or more highly constricted parts through which the cathode rod (rods) is (are) passed leaving only a small clearance.

It should be noted that the electrochemical cell generally has more than one anode rod and more than one cathode rod. Preferably for each of these cathode rods, there is provided a separate constricted area in the cathode compartment. The liquid surface is maintained within the constrictions at the same level as the constriction.

The preferred embodiment of the process is of importance particularly in that the top of the cathode compartment must at regular intervals, be opened for inspection and for replacing a cathode rod. Under those circumstances, the solution is exposed to the air. The small area of contact with the air within the constricted area prevents detrimental oxygen absorption by the solution. The constriction should be sufficiently high to prevent the cathode compartment from overflowing while in the open state. The level of the liquid surface in the constriction(s) of the cathode compartment is determined by the level at which the treated solution is discharged from the separator and by the resistance to flow of the solution from the cathode compartment through the openings in the dividing plate to the de-aerator exit. In these openings there is a constant upward flow so that on the one hand they allow an effective discharge of gas bubbles, such as those of hydrogen and on the other hand they prevent fluid particles which have absorbed oxygen from the air near the liquid surface in the de-aerator from being entrained by the solution recirculating to the cathode compartment.

This embodiment of the process has the great advantage that during inspection and exchanging one of the cathode rods the cell can remain in operation. For, provided that the cell is correctly dimensioned, there will be no risk for it to overflow through the passage of that rod.

Even more favorable results can be obtained with the present process by removing the dissolved oxygen from the solution prior to the latter being subjected to the electrolytic treatment. This can be realized by means that are commonly employed for the deaeration of liquid.

The above-mentioned article in "Erzmetall" also describes an apparatus of the type suitable for carrying out the process indicated in the opening paragraph. The apparatus described comprises an electrochemical cell provided with a cathode compartment into which there extends at least one cathode rod and an anode compartment into which there extends at least one anode rod, which compartments are separated by a diaphragm, and the cathode compartment is to be used for a fluidized bed of conducting particles and has at its base an inlet, and at its top, an outlet for the solution between which there is provided a recirculation conduit for part of the solution, in which conduit there is a gas separator.

The invention provides an apparatus of the above type which is characterized in that the top of the cathode compartment ends in at least one upright tube through which a cathode rod passes leaving a small clearance, and the separator is provided with a dividing surface having one or more openings above which there is the discharge opening for the treated liquid, and which opening is at a level equal to or higher than that of the base of said tube and lower than that of the top, and the recirculation conduit connects to the gas separator at a level below the dividing surface.

It is of importance that the volume of the gas separator below the dividing surface should be such that it is possible for the liquid contained therein to allow the gas bubbles to escape through the openings in the dividing surface.

It is preferred that the dividing surface should be formed by a cross-partition provided with one or more openings whose collective surface area is equal to or smaller than that of the discharge opening for the treated liquid.

In this way it is achieved that across the openings, a pressure difference is set up which is sufficiently high to prevent the liquid above the dividing surface from getting below said surface through the openings, but not so high as to cause the tube or tubes in the cathode compartment to overflow while in the open state.

An embodiment of the present apparatus which offers advantages as far as simple construction and compactness are concerned is obtained if the separator and cathode compartment are assembled to form one unit. The apparatus may then be so formed that the separator surrounds the cathode compartment.

The apparatus according to the invention may advantageously be constructed to include several electrochemical cells which are connected in series. In that case, the exits of the separator of the first, up to and including the next to the last cell are not placed above but below the dividing surface and connected to the supply inlet of the cathode compartment of the next cell in the series. The position of the exit of the last separator of the series remains above the dividing surface. With such an arrangement, a series of metals can be removed from a solution to a large extent and very efficiently.

The present process is suitable for removing various kinds of metals such as copper, zinc, cobalt, mercury, nickel, cadmium and the like from solutions thereof.

It should be added that the cathode and anode rods may have a cross-section other than a round or square cross-section, and for instance, may be plate-shaped. Preferably, the cathode rods are of the same metal as the particles. The anode rods generally have a coating of a noble metal.

EXAMPLE 1

A copper ion-containing waste water stream is subjected to an electrolysis in which use is made of an electrochemical cell containing a fluidized bed of cathode particles known from the above-mentioned article in Erzmetall (Type A) and of one improved according to the invention (Type B).

The electrochemical cell comprises a cylindrical casing 35 cm in diameter and 160 cm in height.

Into this casing, there extends from the top 7, anode rods each of which is surrounded by a tubular diaphragm having an external diameter of 4.55 cm. The total surface area of the diaphragm is 1 m$^2$. The diaphragms have a hydrodynamic permeability of $10^{-2}$ m$^3$/h water per m$^2$ of diaphragm area and at a pressure difference of 100 kPa.

External to the diaphragms 24, cathode rods extend into the cell. The cathode compartment is filled up to a height of 100 cm, with spherical copper particles 0.06–0.1 cm in diameter which grow in the course of the experiment. Anode liquid in the form of a 10% aqueous sulfuric acid solution is passed through the anode compartment which is formed by the spaces within the diaphragms. The waste stream to be treated is squirted through openings into the bottom of the bed of spherical copper particles. The vertical velocity of flow in the bed causes the bed to assume a suspended and whirling state and is so set that the bed height will increase to 125 cm. At the top of the cathode compartment, the waste stream is discharged to a separator positioned adjacent to the cell, and from which separator about 80% of the volume flow which passes through the cathode compartment of the cell is recirculated through the cathode compartment.

In the cell of the known type (Type A) the waste stream has a liquid surface area exposed to the air of about 800 cm$^2$ and one in the separator of about 5000 cm$^2$.

In the cell, according to the invention (Type B), the liquid surface is limited to the space immediately around the cathode rods and has an area of 7 cm$^2$.

In the separator, the area of the liquid surface is equal to that of the type A, but there the liquid surface is 5 cm above a cross-partition provided with one opening 5 cm in diameter. The waste water contains $H_2SO_4$: 50 kg/m$^3$
$Cu^{2+}$: 0.2 kg/m$^3$
$O_2$: 4 g/m$^3$

| Test Results | Type A | Type A | Type B |
|---|---|---|---|
| Volume flow of supplied and discharged waste water | 3 | 3 | 3 |
| Oxygen concentration in liquid to the cell g/m$^3$ | 3.0 | 3.0 | 0.8 |
| Cell current A | 910 | 720 | 720 |
| End-concentration Cu$^{2+}$ kg/m$^3$ | 0.002 | 0.03 | 0.002 |

EXAMPLE 2

With the apparatus as described in Example 1 a waste stream of water containing the following is treated:

$H_2SO$: 2 kg/m$^3$
$Cu^{2+}$: 0.3 kg/m$^3$
$O_2$: 5 g/m$^3$

| Test results | Type A | Type B |
|---|---|---|
| Volume flow of supplied and discharged waste water m$^3$/h* | 1 | 1 |
| Volume flow through cell m$^3$/h | 16 | 16 |

-continued

| Test results | Type A | Type B |
|---|---|---|
| Oxygen concentration in liquid to the cell g/m³ | 3.5 | 0.4 |
| Cell current | 400 | 400 |
| End-concentration Cu²⁺ 0.5 hour after start of test kg/m³ | 0.21 | 0.002 |

*cubic meters/hour

In the apparatus according to the invention (Type B) the end-concentration of 0.002 kg/m³ could be maintained for a long time. Even after 100 hours no change in end-concentration was found. With the Type A, the end-concentration has increased to 0.21 kg/m³ already within half an hour. When the experiment was continued, it was found that the copper substantially only deposits onto the cathode rods and no longer onto the spherical copper particles of the fluidized bed.

The invention will be further described with reference to the accompanying FIGS. 1 and 2 of the drawing.

In FIG. 1, an electrochemical cell 1 has one anode rod 2 and two cathode rods 3. The cell 1 comprises a cylindrical casing 4 within which each anode rod 2 is surrounded by a diaphragm 5 which divides the cell 1 into an anode compartment 6 for the anolyte and a cathode compartment 7 through which the solution to be treated is passed. The diaphragm 5 is of the type which is normally used for the purpose of electrolysis and has a very low liquid permeability and a good current permeability.

At the base of the casing 4, the cell 1 is provided with an inverted frusto conically shaped bottom member 8 which has two compartments, one of which communicates with the anode compartment 6 and has a feed connection 9 for the anolyte, and the other compartment communicates through passages 10 with the cathode compartment 7 and has a feed connection 11 for the solution to be treated. The tubular passages 10 are closed at their tops and provided at their sides with openings 12 through which the solution is squirted into the cathode compartment 7 so that the bed 13 of conductive particles in the cathode compartment can be brought into a fluidized state. At the base of the casing 4 is a connection 14 for the drain pipe with a drain cock 15.

At the top of the casing 4, the cell 1 has a cover 16 which communicates with the anode compartment 6 and is provided with a gland 17 which seals the opening for the anode rod 2. The cover 16 further contains a discharge connection 18 for the discharge of the anolyte.

In the cover 16 are tubes 19 through which the rods 3 are passed. At their base, the tubes 19 are open and at their top, they are closed by glands 20. These glands 20 enclose the rods 3 and leave a small opening (not shown) for allowing the passage of any gases formed such as hydrogen. The cover piece 16 further contains a duct 21 which serves to periodically or continuously allow the escape of gases from the cathode compartment. The cell 1 further has a discharge connection 22 which connects to a feed connection 23 of the separator 24 positioned adjacent to the cell. The separator 24 is formed by a cylindrical casing 25 whose bottom tapers to a connector end 26 to which there is connected a drain pipe provided with a drain cock 27. At the base of the separator 24, there is provided a discharge connector end 28 to which there is connected a recirculation conduit 29.

Above the feed opening 23, the separator 24 has a cross-partition 30 provided with opening 31. Above the cross-partition 30 a discharge connector end 32 for the treated solution is provided on the separator wall 24. The collective surface area of the openings 31 is equal to the surface area of the discharge connector end 32. On the connector end 32, there is placed a discharge conduit 33 which is vented by means of an auxiliary conduit 34. The separator 24 is closed at its top by a cover 35 provided with connector ends 36 and 37 respectively for the supply and the discharge of air for effectively ventilating the space in the top of the separator. In operation, a liquid surface 38 is maintained in the tubes 19 of the cathode compartment 7 and a liquid surface 39 in the separator.

The liquid to be treated is fed to the cell 1 through a conduit 40 into which also ends the recirculation conduit 29. A pump 41 forces a mixture of the liquids to flow from the conduits 40 and 29 to the cell 1.

In its lower part, the separator 24 may have one or more partitions or other screening means to prevent particles that come from the bed 13 from getting into the recirculation conduit 29 to the pump 41.

The apparatus according to FIG. 1 operates as follows.

During operation, a potential difference is maintained between the anode rods 2 and the cathode rods 3. The anolyte, which is usually a dilute aqueous sulphuric acid, is passed through the connection 9 to the anode compartment 6 and leaves the cell through the connection 18. The pump 41 forces a mixture of the still untreated solution and the recirculation solution through the openings 12 into the cathode compartment 7 in which there are solid particles which are subsequently brought into a suspended state such that they collide with each other and with the electrode rods 3.

The resulting transfer of charge causes a metal to deposit from the solution onto the particles of this fluidized bed. When the particles have grown sufficiently, they can be discharged through the drain cock 15 for further processing or removal.

The particles of the fluidized bed preferably consist of grains of the same metal as that to be removed from the solution. For the choice of the particles and the diaphragm 5 to be used, reference may be made generally to the known technical literature. For example, the cathode particles may be any suitable metal such as copper, nickel, cobalt, cadmium, silver, noble metals and others.

The solution which has given up metal ions to the particles of the fluidized bed in the cathode compartment 7 subsequently flows to the separator 24 in which entrained gas bubbles can escape through the openings 31, part of the solution being recirculated through the conduit 29 and the remaining part being discharged pressureless through the connection 32. The level of the opening of the connection 32 and the resistance to flow of the solution between the cathode compartment 7 and opening 32 are determinative of the level of the liquid surface 38 in the cathode compartment 7. This level is about halfway the height of the tube 19. In reality, the area of this liquid surface is particularly small in that the clearance between the tubes 19 and the electrodes enclosed by them may be very small, viz in the order of a few millimeters or less. It will be clear that when a rod 3 is pulled out, the solution will not overflow and the exposure of the liquid surface 38 to the ambient air will only be very limited so that there will be no or very little detrimental absorption of air into the solution. The solution which recirculates via the separator 24 remains effectively screened off from the air in the top of the separator by means of the cross-partition 30, because in the openings 31, an upward flow of the solution to be discharged is maintained.

In the apparatus shown in FIG. 2, the cell and the separator form an integrated unit 43. It comprises a cylindrical casing 44, a bottom piece 45 and a cover 46. Placed on the bottom piece 45 within the casing 44, there is a concentrical casing 47 surrounding the cathode compartment 7. Below the cover 46, the casing 47 leaves a large opening for the solution which, coming from the fluidized bed, is partially recirculated through the space between the casings 44 and 47 and partially passes through the openings 31 to the discharge conduit 33.

Although the invention has been described in detail for the purposes of illustration, it is to be understood that such detail is solely for the purpose of illustration and that variations can be made therein without departing from the spirit and scope of the invention except as it may be limited by the claims.

What is claimed is:

1. A process for electrolytically removing metal ions from a solution thereof by means of an electrochemical cell having an anode compartment, a cathode compartment and a diaphragm separating said compartments, said process comprising passing the solution upwardly through a bed of particles acting as cathodes in the cathode compartment of the cell and thereby bringing said bed to a fluidized state, recirculating a part of the solution leaving the cathode compartment through said bed and discharging the remainder thereof from the cell, passing an anode liquid through the anode compartment, passing said recirculated solution through a separator for gas present in the solution while maintaining in the separator a liquid surface of the solution and ventilating the space above the solution, said separator having a dividing surface with at least one opening for the passage of gas bubbles, maintaining an upward flow of the treated solution, flowing under the dividing surface the solution from the cathode compartment to the separator and returning said recirculated part of the solution to the cathode compartment, maintaining the liquid surface above the said dividing surface, discharging the treated solution from above the dividing surface, and maintaining a liquid surface in the top of the cathode compartment with at least one highly constricted part through which at least one cathode rod passes with a small clearance.

2. In a process for removing metal ions by electrolysis from a solution thereof which comprises maintaining a potential difference between an anode and a fluidized bed of cathode particles maintained in suspension by flowing the solution through the said bed, recirculating a portion of the solution and discharging the remainder thereof, circulating an anolyte about the anode, the improvement which comprises excluding air from the solution to avoid absorption of oxygen and oxidation of said particles with accompanying reduction of electrolytic activity of the particles.

3. A process according to claims 1 or 2 characterized in that the dissolved oxygen is removed from the solution prior to the latter being subjected to electrolytic treatment.

4. An apparatus for carrying out the process according to claim 1 or 2 which apparatus comprises an electrochemical cell provided with a cathode compartment into which there extends at least one cathode rod and an anode compartment into which there extends at least one anode rod, which compartments are separated by a diaphragm, and the cathode compartment is to be used for a fluidized bed of conducting particles and has at its base an inlet and at its top an outlet for the solution between which there is provided a recirculation conduit for part of the solution, in which conduit there is a gas separator, characterized in that the top of the cathode compartment ends in at least one upright tube through which a cathode rod passes leaving a small clearance, and the separator is provided with a dividing surface having one or more openings above which there is the discharge opening for the treated liquid, and which opening is at a level equal to or higher than that of the base of said tube and lower than that of the top, and the recirculation conduit connects to the gas separator at a level below the dividing surface.

5. An apparatus for carrying out the process of claim 3 which apparatus comprises an electrochemical cell provided with a cathode compartment into which there extends at least one cathode rod and an anode compartment into which there extends at least one anode rod, which compartments are separated by a diaphragm, and the cathode compartment is to be used for a fluidized bed of conducting particles and has at its base an inlet and at its top an outlet for the solution between which there is provided a recirculation conduit for part of the solution, in which conduit there is a gas separator, characterized in that the top of the cathode compartment ends in at least one upright tube through which a cathode rod passes leaving a small clearance, and the separator is provided with a dividing surface having one or more openings above which there is the discharge opening for the treated liquid, and which opening is at a level equal to or higher than that of the base of said tube and lower than that of the top, and the recirculation conduit connects to the gas separator at a level below the dividing surface.

6. An apparatus according to claim 4, characterized in that the dividing surface is formed by a cross-partition whose openings have a collective surface area which is equal to or smaller than that of the discharge opening for the treated liquid.

7. An apparatus according to claim 4 characterized in that the separator and the cathode compartment are assembled to form one unit.

8. The apparatus of claim 6 characterized in that the separator and the cathode compartment are assembled to form one unit.

9. An apparatus according to claim 7 characterized in that the separator surrounds the cathode compartment.

10. An apparatus for electrolytically removing metal ions from an aqueous medium containing metal ions comprising an electrochemical cell which comprises a cathode compartment, an anode compartment, a diaphragm separating said compartments, a bed of cathode particles disposed in the cathode compartment, means for recirculating solution in the cell through the cathode compartment at a velocity whereby the cathode particles become suspended and form a fluidized bed, means for flowing an anode liquid through the anode compartment, a cathode in the cathode compartment, an anode in the anode compartment, a means for maintaining an electrical potential between the anode and cathode, and means for substantially excluding air from contact with the solution in the cathode compartment and in the said recirculating means.

* * * * *